United States Patent [19]
Willard

[11] 3,834,201
[45] Sept. 10, 1974

[54] APPARATUS FOR FORMING A MARGINAL EDGE PORTION OF METAL WORK PIECES

[75] Inventor: Wayne E. Willard, Independence, Mo.

[73] Assignee: Blue Valley Machine and Manufacturing and Company, Kansas City, Mo.

[22] Filed: May 7, 1973

[21] Appl. No.: 358,084

[52] U.S. Cl............................. 72/70, 72/81, 72/7, 83/565
[51] Int. Cl............................................ B21d 19/12
[58] Field of Search............... 72/70, 72, 81, 86, 87, 72/7; 83/413, 565

[56] References Cited
UNITED STATES PATENTS

| | | | |
|---|---|---|---|
| 888,429 | 5/1908 | Skinner | 83/565 |
| 1,353,756 | 9/1920 | Johanson | 83/413 |
| 1,907,664 | 5/1933 | Preston et al. | 72/72 |
| 2,308,432 | 1/1943 | Johnson | 72/81 |

*Primary Examiner*—Lowell A. Larson
*Attorney, Agent, or Firm*—Fishburn, Gold & Litman

[57] ABSTRACT

An apparatus for forming a marginal edge portion of metal work pieces includes a trimming unit adapted to trim a marginal edge portion of a work piece to a shape in accord with the shape of a template. The work piece is rotatably mounted on a carriage movably along an elongated track between the trimming unit and a forming unit adapted to bend of form the marginal edge portion of the work piece. The carriage is substantially freely movable along the track and the trimming unit and the forming unit each have heads mounted to turn about vertical axes and each have roll portions for gripping marginal portions of the work piece. Template followers are arranged for each head and spaced from and in leading relation to the respective vertical axis of the head. The template followers are operatively connected through servo mechanism to respective head portion turning members whereby the heads are turned to maintain the work piece advancing into the gripping rolls for operative engagement with the respective head portion of the trimming unit or forming unit.

10 Claims, 7 Drawing Figures

PATENTED SEP 10 1974    3,834,201

APPARATUS FOR FORMING A MARGINAL EDGE PORTION OF METAL WORK PIECES

The present invention relates to trimming and forming of marginal edge portions of metal work pieces and more particularly, to an apparatus having a carriage freely movable along a track between a trimming unit and a forming unit which each have rotatably mounted head portions which are turned in response to movement of template following members to effect advance of the work piece into the respective unit.

The principal objects of the present invention are to provide an apparatus for trimming and forming a marginal edge portion of metal work pieces which includes a carriage substantially freely movable along a line toward and away from a forming unit having a head portion rotatable about a substantially vertical axis of a respective base portion and means to control said rotation to position operative parts of the respective head portion at a position conforming to the peripheral edge of a guide template; to provide such an apparatus wherein the template following members are positioned in spaced relation and in leading relation with the vertical axis of the respective base portion and operatively connected to means for turning the respective head portion in response to movement of the template following members; to provide such an apparatus for trimming and forming a marginal edge portion of metal work pieces wherein the respective head portion is turned to move gripping and forming members into engagement with the work piece and maintain positive engagement of the work piece with respective operative parts of the trimming unit and forming unit respectively all in response to movement of template followers; to provide such an apparatus for trimming and forming a marginal edge portion of a metal work piece having members adapted to effect feed of the work piece into a respective trimming unit and forming unit in response to change of shape of a guide template; to provide such an apparatus for trimming and forming a marginal edge portion of a metal work piece which is economical to manufacture, positive in operation, durable in construction, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment of the present invention and illustrate various objects and features of the apparatus for trimming and forming a marginal edge portion of metal work pieces.

Figure 1:
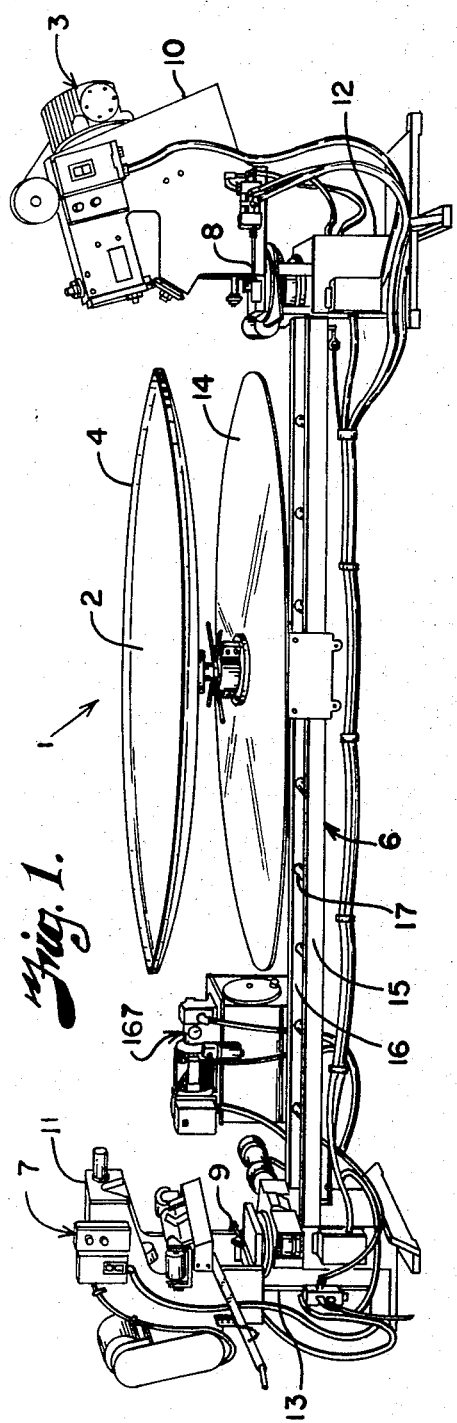
FIG. 1 is a perspective view of an apparatus for trimming and forming a marginal edge poriton of a metal work piece and embodying features of the present invention.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the disclosed embodiment of the present invnetion, the reference numeral 1 generally designates an apparatus for trimming and/or forming a marginal edge portion of a metal work piece 2. The apparatus 1 includes a forming unit, such as a trimming unit 3 adapted to trim a marginal edge portion 4 of a work piece 2 rotatably mounted on a carriage 5 which is movable along a line as along an elongated track 6 toward and away from forming or trimming unit 3. The carriage may also move toward and away from a forming or flanging unit 7 which is adapted to flange the marginal edge portion 4 of the work piece 2. The carriage 5 is substantially freely movable along the track 6 and the trimming unit 3 and the forming unit 7 each have template following members 8 and 9 respectively mounted on rotatable head portions 10 and 11 of the trimming unit 3 and the forming unit 7 respectively. The template following members 8 and 9 are spaced from and in leading relation with a vertical axis of base portions 12 and 13 of the trimming unit 3 and the forming unit 7 respectively. The template following members 8 and 9 are operatively connected to respective head portion turning members whereby turning of the head portions 10 and 11 respectively moves gripping and forming members into engagement with the work piece 2 and maintains positive engagement of the work piece 2 and a guide template 14 mounted on the carriage 5 with operative parts of the head portion 10 and 11 of the respective trimming unit 3 and the forming unit 7 all in response to movement of the respective template following members 8 and 9.

In the illustrated structure, a trimming unit 3 and a flanging unit 7 ar positioned with a track 6 extending therebetween so the template and a sheet to be trimmed and/or formed may be selectively moved therebetween. The track 6 may be any suitable structure adapted to permit the carriage 5 to move between or relative to the trimming unit 3 and the forming unit 7. In the illustrated structure, the track 6 includes a pair of laterally spaced rails 15 and 16 and a plurality of spacers 17 extending therebetween with the spacers 17 being longitudinally spaced along the rails 15 and 16.

Figure 2:
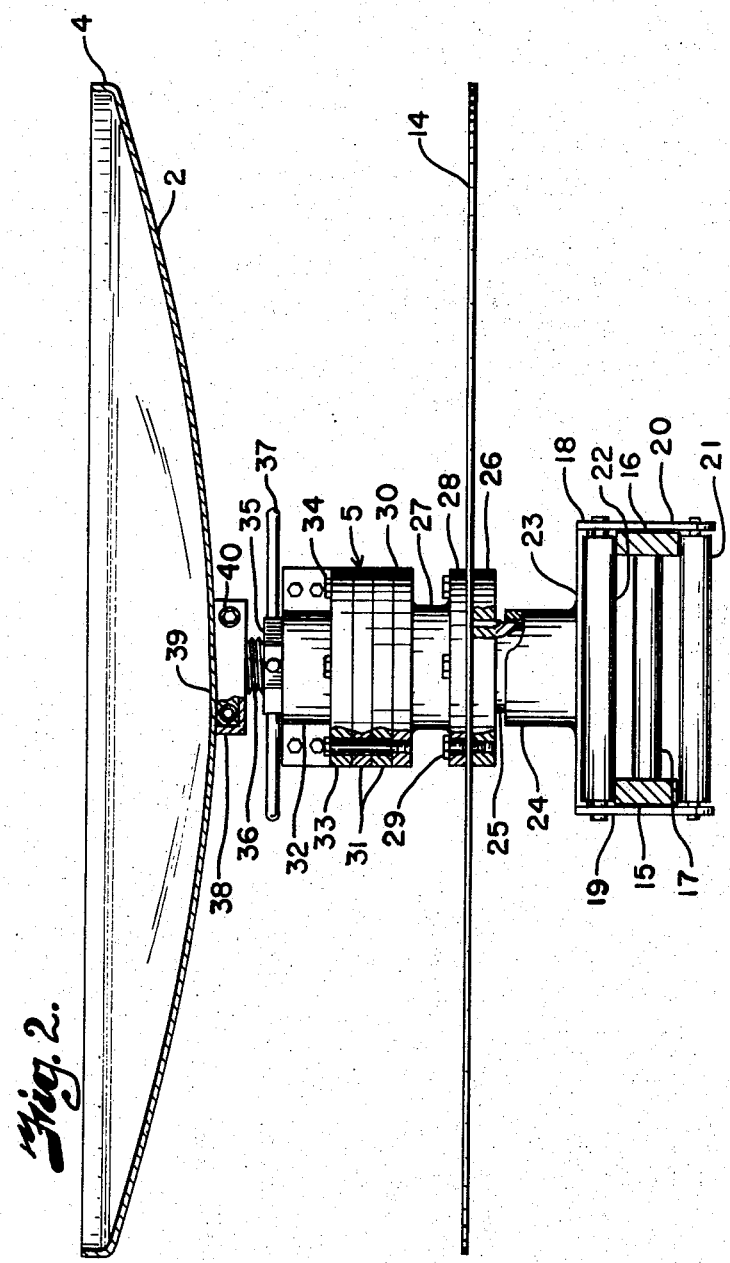
FIG. 2 is a side elevational view of a carriage rotatably supporting a guide template and a work piece with portions broken away to better show component parts of the carriage.
Figure 3:
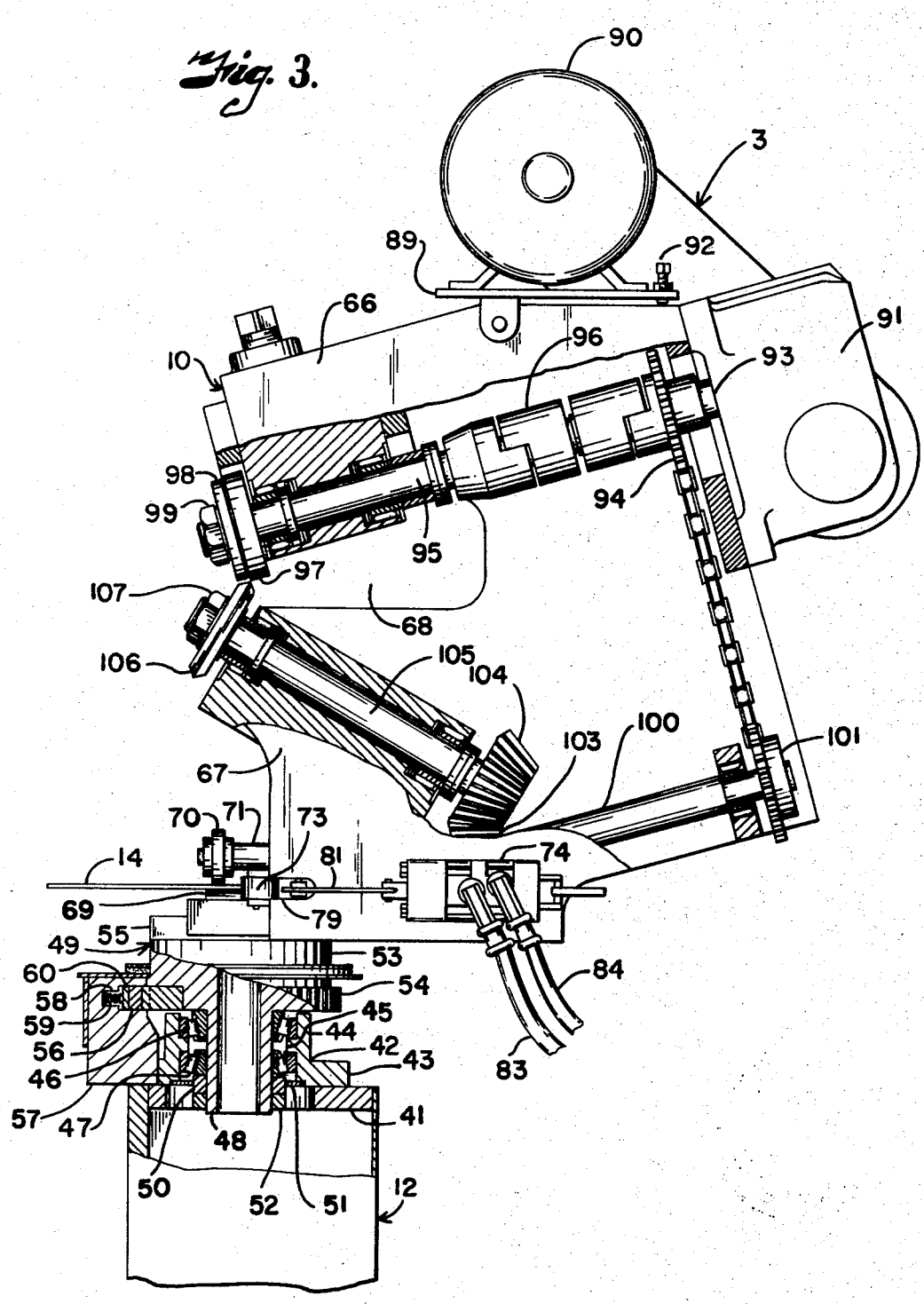
FIG. 3 is a side elevational view of a work piece trimming unit with portions broken away to better show the operative components thereof.
Figure 4:
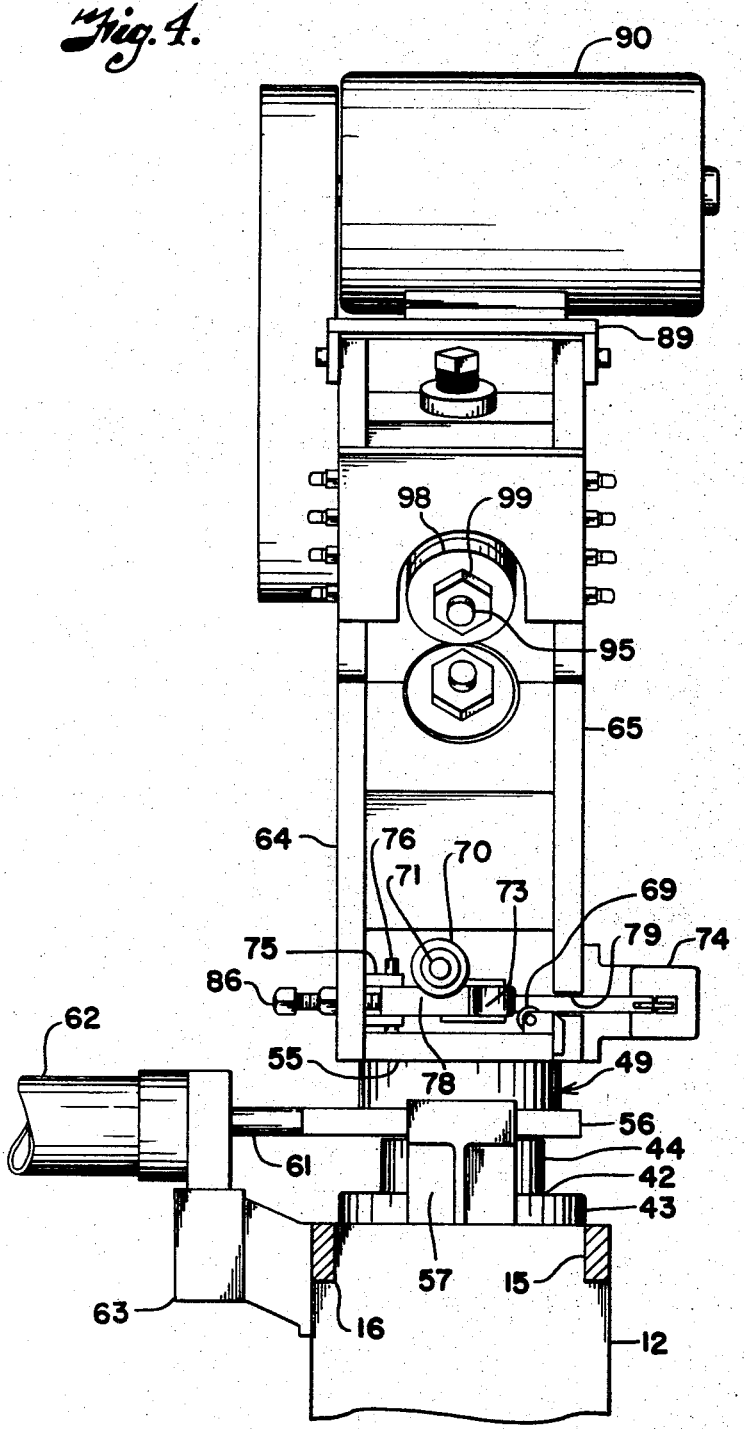
FIG. 4 is a front elevational view of the work piece trimming unit.
Figure 5:
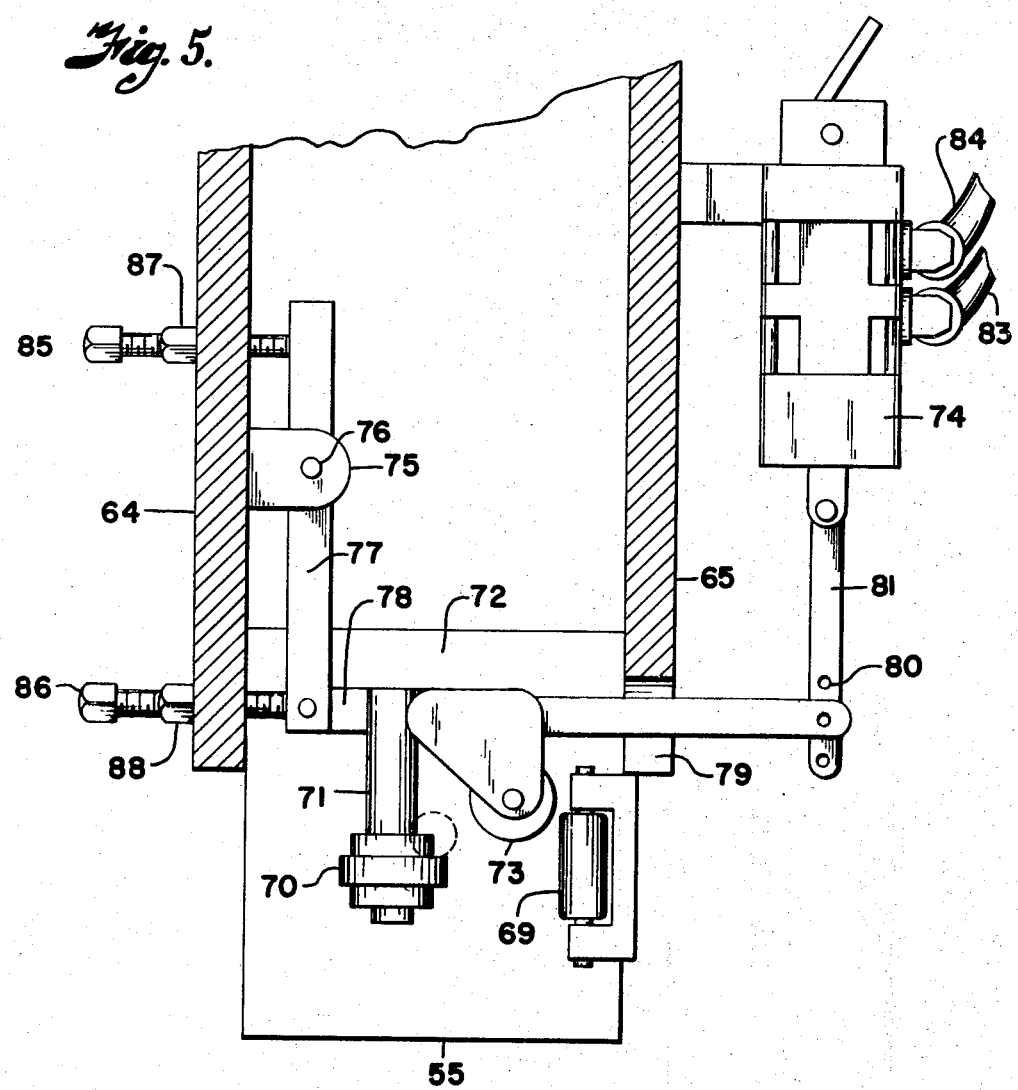
FIG. 5 is an enlarged fragmentary plan view of template engaging members and linkage for communicating movement of the template engaging members to head portion turning members.
Figure 6:
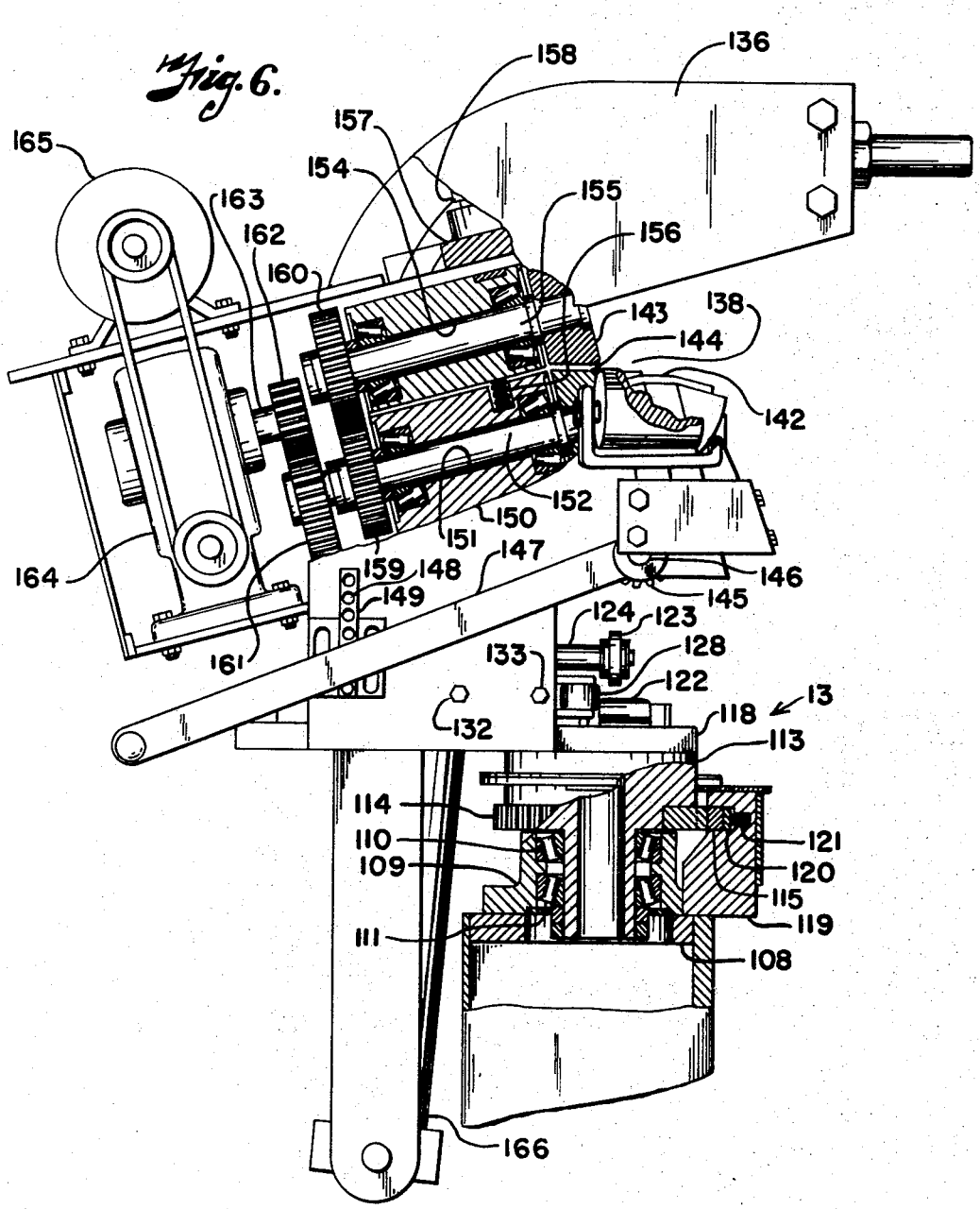
FIG. 6 is a side elevational view of a work piece forming unit with portions broken away to better show operative components thereof.
Figure 7:
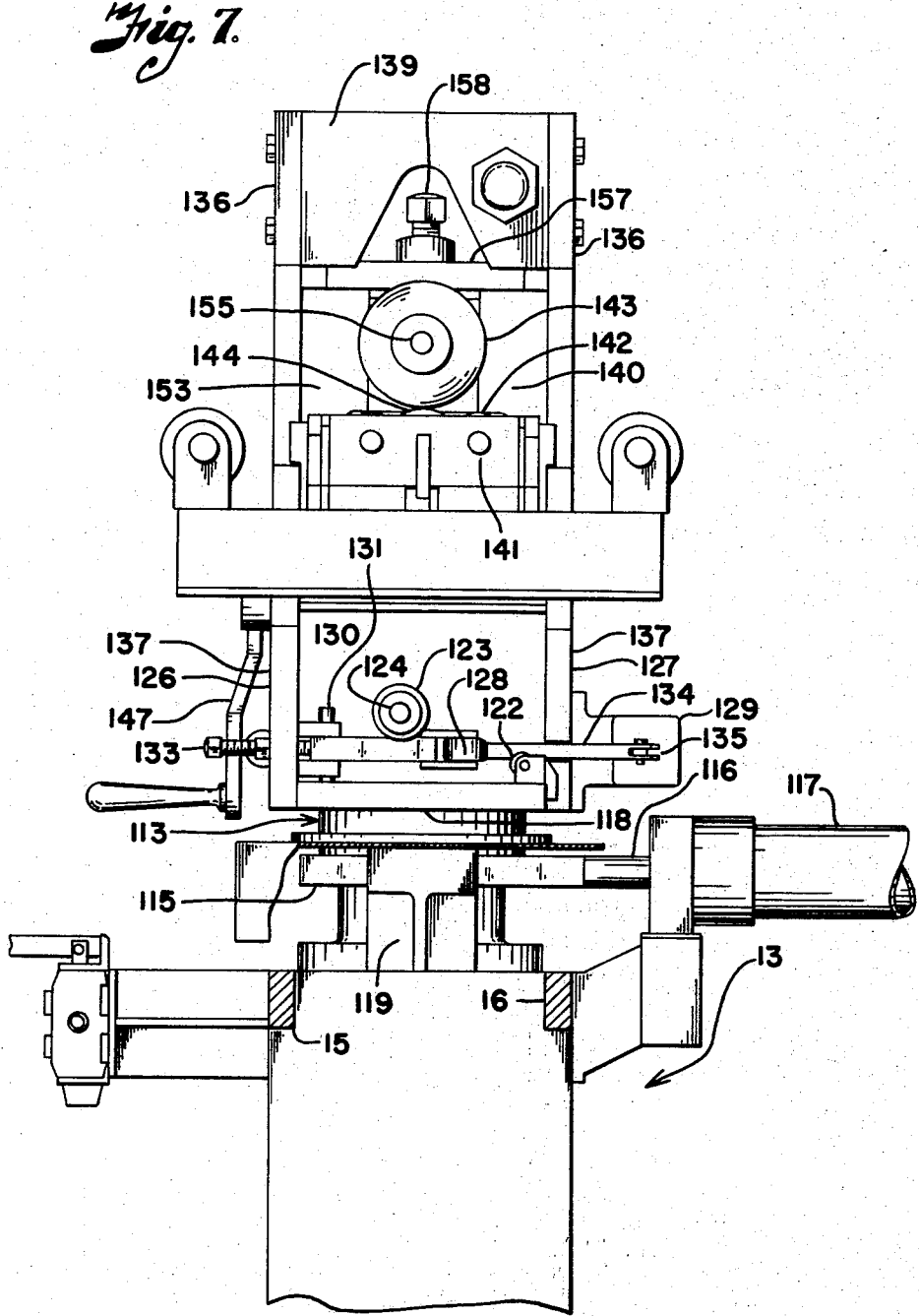
FIG. 7 is a front elevational view of the work piece forming unit.

As best seen in FIG. 2, the carriage 5 includes a base 18 movable along the rails 15 and 16 of the track 6 and the base 18 includes side walls or frames 19 and 20 positioned adjacent exterior sides of the rails 15 and 16 respectively. A plurality of lower rollers 21 are positioned below and in engagement with lower edges of the rails 15 and 16. The lower rollers 21 extend between and have respective opposite ends thereof rotatably mounted on the rails 15 and 16. The base 18 includes a plurality of upper rollers 22 positioned in engagement with upper edges of the rails 15 and 16. The upper rollers 22 are positioned between the side walls 19 and 20 and have respective opposite ends thereof rotatably mounted on the side walls 19 and 20.

The base 18 of the carriage 5 includes a top plate 23 extending between upper edges of the side walls 19 and 20 and positioned between the upper rollers 22. A tubular sleeve 24 extends upwardly from the top plate 23 and has a suitable bearing surface (not shown) therein for rotatably supporting a spindle 25 received therein. The template 14 is supported on a flange 26 on the upper end of the spindle 25.

The work piece 2 is positioned above the template 14 at a desired spacing and it is desirable to provide means for adjusting the spacing between the template 14 and the work piece 2. Therefore, suitable spacers are mounted on the template 14 and secured to the flange 26 on the upper end of the spindle 25. In the illustrated structure, a work piece spacer 27 has a lower flange 28 in engagement with the template 14 and secured to the flange 26 on the upper end of the spindle 25, as by suitable fastening devices 29, such as bolts or screws. The work piece spacer 27 has an upper flange 30 and one or a plurality of spacer discs 31 may be mounted thereon as desired.

An adjustable work piece holder 32 has a lower flange 33 suitably secured to the spacer disc or discs 31 and to the upper flange 30 of the work piece spacer 27, as by suitable fastening devices 34, such as bolts or screws. The work piece holder 32 is preferably tubular and adapted to rotatably receive and support therein a sleeve 35 which is internally threaded to receive an exteriorly threaded shaft 36. The sleeve 35 has a suitable handle or handles 37 mounted adjacent the upper end thereof for rotating the sleeve 35 in the work piece holder 32 thereby selectively raising or lowering the shaft 36 which has a socket 38 suitably mounted on the upper end thereof, as by welding, and adapted to receive a key 39 which is secured to a lower surface of the work piece 2, as by welding. The key 39 is retained in the socket 38 by suitable fastening devices 40, such as bolts, whereby turning the sleeve 35 by the handles 37 will raise or lower the shaft 36 and the work piece 2 thereby positioning the work piece to conform to the operative parts of the trimming unit 3 or the forming unit 7.

The base portion 12 of the trimming unit 3 is suitably secured to a floor or foundation and rotatably supports the head portion 10 thereon. The illustrated base portion 12 includes a top member 41 having a bearing support 42 suitably secured thereon, as by welding.

The bearing support 42 has a base flange 43 mounted on an upper surface of the top member 41 of the base 12. The bearing support 42 has an upstanding tubular body 44 having an inwardly extending rib 45 spaced intermediate upper and lower ends of the body 44. Suitable upper and lower bearings 46 and 47 respectively are in the bearing support 42 and in engagement with a depending body portion 48 of a gear member 49 and are suitably spaced and supported, as by the rib 45.

The gear member 49 is rotatably mounted within the bearing support 42 and has the head portion 10 mounted thereon whereby the head portion 10 is rotatable about a substantially vertical axis of the gear member 49. The body portion 48 of the gear member 49 is illustrated as tubular for lightness in weight. A suitable collar 50 is mounted on the body portion 48 adjacent the lower end thereof and is in engagement with the lower bearing 47 for supporting same. A suitable lock ring 51 is mounted in the bearing support member 42 and closes a space between the body portion 48 of the gear member 49 and an interior surface of the tubular body 44 of the bearing support 42. A lock collar 52 is mounted on the lower end of the body portion 48 and in engagement with the collar 50 to retain same on the body portion 48. An upper end 53 of the gear member 49 has a plurality of circumferentially spaced teeth defining a pivot gear 54.

A base member 55 of the head portion 10 of the trimming unit 3 is suitably mounted on the upper end 53 of the gear member 49, as by welding, whereby rotation of the gear member 49 in the bearing support 42 effects rotation or turning of the head portion 10 about the vertical axis of the body portion 48 of the gear member 49.

A rack 56 is in engagement with the pivot gear 54 and movement of the rack 56 effects rotation of the pivot gear 54. In the illustrated sturcture, a rack guide 57 is suitably mounted on the top member 41 of the base portion 12 and has a passage therethrough positioned adjacent the pivot gear 54. The passage is defined by walls and one of the walls has a plurality of recesses 58 therein adapted to receive a respective compression spring 59 adapted to urge a rack gib 60 into firm engagement with the rack 56 and thereby effect firm engagement between the rack 56 and the pivot gear 54.

The rack 56 is mounted on the end of a shaft 61 of an extensible member 62 which is operative to extend and retract the shaft 61. The extensible member 62 is operatively connected to the template following member 8 mounted on the trimming unit 3 whereby the head portion 10 is rotated in response to movement of the template following member 8. The extensible member 62 is suitably supported on a bracket 63 mounted on and extending outwardly from the base portion 12.

The head portion 10 has spaced side frames 64 and 65 mounted on the base member 55 and extending upwardly therefrom. The side frames 64 and 65 each have upper and lower arms 66 and 67 respectively positioned to define a mouth 68 for receiving a work piece 2 therein.

The template 14 is a generally planar member having a lower surface thereof supported on a lower guide roller 69 which is suitably supported on the base member 55 of the head poriton 10. Vertical movement of the edge portion of the template 14 is restrained by an upper guide roller 70 which is rotatably mounted on one end of a shaft 71 having the other end thereof suitably secured to a rod or bar 72 extending between the side frames 64 and 65.

The template following members 8 includes a roller 73 engageable with a peripheral edge of the template 14 and the roller 73 is spaced from and in leading relation with the vertical axis of the base portion 12 and the template following members 8 is operatively connected to the extensible member 62 whereby turning of the head poriton 10 move gripping and forming members into engagement with the work piece 2 and maintains positive engagement of the work piece 2 and the template 14 with respective components of the head portion 10 all in response to movement of the template following members 8.

The roller 73 is mounted on a linkage having one end thereof adjustably mounted on the head portion 10 of the trimming unit 3 thereby permitting adjustment of the spacing between the vertical axis of the base portion 12 and the roller 73. The other end of the linkage is operatively connected to a servo valve 74 which is connected to the extensible member 62 and is responsive to travel of the roller 73 along the periphery of the marginal edge portion of the guide template 14.

In the illustrated structure, a bracket 75 is mounted on an interior surface of one of the side frames of the head portion 10, for example side frame 64, and a pivot pin 76 is mounted on bracket 75 and extends through a first link 77 which is positioned adjacent and substantially parallel with the side frame 64. The pivot pin 76 is positioned intermediate the ends of the first link 77 and a second link 78 has one end thereof pivotally connected to the first link 77 adjacent one end of said first link 77.

The roller 73 is mounted on the second link 78 and is positioned intermediate the ends thereof. The other side frame 65 has a slot 79 therein to permit the second link 78 to move in a substantially coplanar relation with the template 14. The other end of the second link 78 has an aperture therein alignable with a respective one of a plurality of apertures 80 in one end of a third link 81 for receiving a suitable fastening device, such as a pin or the like, for pivotally connecting the other end of the second link 78 to the one end of the third link 81. The third link 81 has the other end thereof pivotally connected to the servo valve 74 whereby movement of the roller 73 is communicated to the servo valve 74.

The servo valve 74 has a manual lever 82 to adjust the pressure on the third link 81 and thereby the pressure on the roller 73 for engagement with the edge of the template 14. The servo valve 74 includes a suitable piston (not shown) operative to divide the valve 74 into spaced chambers having respective conduits 83 and 84 communicating with respective chambers and connected to respective ends of the extensible member 62 whereby movement of the roller 73 effects turning of the head portion 10 to move gripping and forming members, as later described, on the head poriton 10 relative to the work piece 2 and effect movement of the work piece 2 into or out of the head portion 10 and maintain the operative parts of the head portion 10 in engagement with the work piece 2 and the template 14 all in response to movement of the roller 73.

The spacing between the roller 73 and the vertical axis of the base portion 12 is adjustable to conform to the shape and size of the template 14. In the illustrated structure, the one side frame 64 has a pair of spaced apertures (not shown) therein adapted to permit adjusting screws 85 and 86 respectively to extend through the one side wall or frame 64 and into engagement with respective opposite ends of the first link 77. Suitable nuts 87 and 88 are mounted on the one side frame 64 and aligned with the apertures therethrough to receive the screws 85 and 86 respectively.

The head portion 10 of the trimming unit 3 has a platform 89 pivotally mounted on an upper portion of the side frames 64 and 65. The platform 89 supports a suitable drive motor 90 which is operatively connected to a gear reduction unit 91 which is suitably mounted on the head portion 10 of the trimming unit 3. Suitable belts or chains extending between the drive motor 90 and the gear reduction unit 91 are maintained in tension by adjusting the space between the motor 90 and the gear reduction unit 91, as by at least one adjusting screw 92 extending through the platform 89 and into engagement with an upper edge of a respective one of the side frames of the head portion 10.

The gear reduction unit 91 is operative to rotate a drive shaft 93 having a suitable sprocket 94 thereon. The drive shaft 93 is operatively connected to an upper shaft 95, as by suitable couplings 96, and the upper shaft 95 has an upper shear blade 97 mounted thereon. The work piece gripping members include a work piece driver 98 and the work piece driver 98 has a surface engageable with an upper surface of the work piece 2 and is mounted on the upper shaft 95 and is retained in engagement with the upper shear blade 97 by a suitable fastening member 99, such as a nut.

A lower drive shaft 100 is rotatably mounted between the side frames 64 and 65 and has a sprocket 101 mounted thereon and adapted to receive an endless chain 102 extending between the sprocket 94 and the sprocket 102 whereby the drive shaft 93, upper shaft 95, and lower drive shaft 100 rotates at the same rate. The lower drive shaft 100 has a bevel gear 103 mounted thereon and engageable with a bevel gear 104 on a lower driven shaft 105. The lower driven shaft 105 has a lower shear blade 106 mounted thereon and retained in position by a suitable fastneing device 107, such as a nut. The work piece gripping members include a lower shear blade 106 and the lower shear blade 106 has a surface aligned with the surface of the work piece driver 98 to thereby grip the work piece 2 between the driver 98 and the blade 106.

The cutting edges of the upper shear blade 97 and the lower shear blade 106 define the forming members and are positioned above and substantially aligned with the vertical axis of the base portion 12 whereby turning of the head portion 10 in response to movement of the roller 73 maintains the cutting edges of the upper shears blade 97 and the lower shear blade 106 directly above and aligned with the peripheral edge of the template 14. The spacing between the roller 73 and the vertical axis of the base portion 12, as defined by the axis of the gear member 49, allows for the time lag between movement of the roller 73 and turning of the head portion 10 thereby trimming the work piece 2 in a shape conforming to the peripheral edge of the template 14. Turning of the head portion 10 is effective to change the angle of approach of the work piece 2 into the gripping and forming members in accordance with the shape of the periphery of the guide template 14.

The base portion 13 of the forming unit 7 is substantially similar to the base protion 12 of the trimming unit 3 and the base portion 13 is suitably secured to a floor or foundation and rotatably supports the head portion 11 thereon. The base portion 13 has a top member 108 on which is moutned a bearing support 109 which is similar to the bearing support 42 and has upper and lower bearings 110 and 111 respectively positioned therein and in engagement with a body portion 112 of a gear member 113.

The gear member 113 has a substantially vertical axis defining the vertical axis of the base portion 13. The gear member 113 has a plurality of circumferentially spaced teeth on an upper end thereof thereby defining a pivot gear 114 engaged by a rack 115 secured to one end of a shaft 116 extending from a suitable extensible member 117. The head portion 11 of the forming unit 7 has a base member 118 secured to an upper end of the gear member 13 whereby operation of the extensible member 117 and the rack 115 effects turning of the head portion 11 in a manner similar to turning of the head portion 10 of the trimming unit 3.

A rack guide 119 is mounted on the top member 108 and has a suitable passage therethrough aligned with the pivot gear 114 and adapted to receive a rack gib 120 which is urged into engagement with the pivot gear 114 by suitable compression springs 121 mounted in recesses in the rack guide 119.

The template 14 is supported on the head portion 11 of the forming unit 7 in a manner similar to the support of the template 14 on the head portion 10 of the trimming unit 3. A lower guide roller 122 is mounted on the base member 118 and adapted to support a lower surface of the template 14 and an upper guide roller 123 is spaced from the lower roller 122 and positioned to engage an upper surface of the template 14. The upper guide roller 123 is rotatably mounted on one end of a shaft 124 having the other end thereof secured to a suitable rod or bar (not shown) extending between side frames 126 and 127 secured to the base member 118 and defining the head portion 11 of the forming unit 7.

The template following members 9 of the forming unit 7 are substantially similar to the template following members 8 of the trimming unit 3 and include a roller 128 having an edge or rim engageable with the peripheral edge of the template 14. The roller 128 is mounted on a linkage having one end thereof adjustably mounted on the head portion 11 of the forming unit 7 whereby the spacing between the roller 128 and the vertical axis of the base portion 13 is adjustable. The other end of the linkage is operatively connected to a servo valve 129 which is operatively connected to the extensible member 117 whereby travel of the roller 128 along the marginal edge portion of the guide template 14 effects turning of the head portion 11.

A bracket 130 is mounted on one of the side frames, for example, side frame 126, and pivotally supports a first link (not shown), as by a pin 131. Adjusting screws 132 and 133 are mounted on and extend through the side frame 126 and engage respective opposite ends of the first link (not shown) to adjust the spacing between the roller 128 and the vertical axis of the base portion 13.

A second link 134 has the roller 128 mounted thereon and positioned intermediate the ends thereof. One end of the second link 134 is pivotally connected to one end of the first link (not shown) and the other end thereof is pivotally connected to one end of a third link 135 which has the other end thereof pivotally connected to the servo valve 129 which is operatively connected to the extensible member 117.

The side frames 126 and 127 of the head portion 11 each have forwardly extending upper and lower arms 136 and 137 respectively which are spaced apart to provide an open mouth 138 adapted to receive the work piece 2 therein. An upper cross bar 139 and the base member 118 extend between and have the side frames 126 and 127 suitably connected thereto to provide a rigid structure and maintain positive spacing between suitable arcuate tracks (not shown) on facing surfaces of the side frames 126 and 127 for movement of a bending head 140 therebetween.

A movable cross bar 141 is positioned between the lower arms 137 of the side frames 126 and 127 and carries a plurality of pressure rollers 142 rotatably mounted on suitable studs. The pressure rollers 142 each have the peripheries thereof coned to provide a rolling horizontal support in substantial alignment with upper and lower flanging or bending rollers 143 and 144 respectively which are carried on the bending head 140, as later descirbed, and which define gripping and forming members for forming a marginal edge portion 4 of the work piece 2 while rotating the work piece 2 and the template 14 on the carriage 5. The movable cross bar 141 is moved in suitable guide grooves (not shown) in facing surfaces of the side frames 126 and 127 to adjust the pressure rollers 142 into supporting contact with a work piece 2 by means of a gear 145 which meshes with suitable rack teeth (not shown) formed in an interior face of the movable cross bar 141. The gear 145 is mounted on a suitable shaft 146 journaled in one of the arms 137 and adapted to be rotated by a crank 147 that is fixed thereon. The crank or lever 147 is maintained in an adjusted position by a pin (not shown) which may be inserted in one of a plurality of apertures 148 in a bar 149 mounted on the one side frame.

The bending head 140 is adapted to move between the side frames 126 and 127 in guided relation in an arcuate path and the bending head 140 includes a blocklike body 150 which is provided with a bore 151 having bushed ends and in which is rotatably mounted a drive shaft 152 carrying the lower bending roller 144 thereon. The portion of the body 150 directly above the drive shaft 152 has a parallel recess in which a bearing block 153 is pivotally supported and the bearing block 153 has a bore 154 pivoted with bushed ends journalling a driven shaft 155 carrying the upper bending roller 143 thereon.

The bending rollers 143 and 144 are urged apart by a coil spring having one end seated in a suitable socket at the bottom of the recess receiving the bearing block 153 and the other end seated in a socket formed in the facing side of the bearing block 153. A yielding pressure, however, is applied to the bearing block 153 to retain the rollers 143 and 144 in contact with the work piece 2 by means of a cross bar 157 extending transversely of the bearing block 153 and having its ends slidably supported on suitable studs (not shown) carried by the body 150.

Threadedly mounted in an opening at the center of the cross bar 157 is a pressure adjusting screw 158 engaging the bearing block 153. The studs preferably project through the cross bar 157 and carry suitable coil springs each having one of its ends bearing against the bar and the other end against a washer retained on the respective stud, as by a suitable adjusting nut (not shown).

The drive shaft 152 carries a gear 159 meshing with a gear 160 on the driven shaft 155. The drive shaft 152 has a second gear 61 mounted thereon which meshes with a pinion gear 162 mounted on a shaft 163 extending from a gear reduction unit 164, which is operative to rotate the shaft 163 and thereby rotate the upper and lower bending rollers 143 and 144.

A suitable drive motor 165 is operatively connected to the gear reduction unit 164 and the drive motor 165 and gear reduction unit 164 are suitably supported on the head portion 11. When the drive motor 165 is energized, the bending rollers 143 and 144 are simultaneously rotated to feed the marginal edge portion 4 of the work piece 2 therebetween. In order to effect positive feed of the work piece 2, the periphery of one of the rollers, for example, the lower bending roller 144 may be knurled or otherwise roughened, as desired.

The bending head 140 is moved in an arcuate path between the side frames 126 and 127 and thereby about an axis of the mouth 138 by means of a suitable extensible member 166 having one end pivotally supported on the floor or foundation and a suitable shaft (not shown) movable with respect to a body and pivotally connected to the bending head 140. The extensible member 166 is preferably manipulated by suitable controls contained in a control unit 167.

The upper flanging or bending roller 143 has a side surface which engages an upper surface of the marginal edge portion of the work piece 2 and the lower flanging or bending roller 144 has a side surface which engages a lower surface of the marginal edge portion of the work piece 2 thereby gripping the work piece 2 between the bending rollers 143 and 144.

The axis of the mouth 138 is above and substantially normal to the vertical axis of the base portion 13 and the bending rollers 143 and 144 are positioned above and have respective edges thereof substantially aligned with the vertical axis of the base portion 13 whereby turning of the head portion 11 in response to travel of the roller 128 maintains the respective edges of the bending rollers 143 and 144 directly above and aligned with the marginal edge portion of the guide template 14. Turning of the head portion 11 is effective to change the angle of approach of the work piece 2 into the gripping and forming rollers 143 and 144 in accordance with the shape of the periphery of the guide template 14.

In using a trimming and forming apparatus constructed as illustrated and described, the desire template 14 is mounted on the carriage 5 and suitable spacers are mounted on the carriage 5 above the template 14. The key 39 is suitably secured to the axial center of the work piece 2, as by being welded thereto. The key 39 is positioned in the socket 38 on the upper end of the shaft 36 supported on the carriage 5. The fastening devices 40 secure the key 39 in the socket 38. The carriage 5 with the template 14 and the work piece 2 mounted thereon is then moved into engagement with the trimming unit. The adjusting screws 85 and 86 are adjusted to position the roller 73 at a selected spacing from the vertical axis of the base portion 12 when the roller 73 is in engagement with the peripheral edge of the template 14. The drive motor 90 is then energized to effect rotation of the upper shear blade 97 and the lower shear blade 106. Gripping engagement of the work piece driver 98 and the lower shear blade 106 with the work piece 2 effects rotation of the work piece 2 and the template 14 of the carriage 5. Movement of the roller 73 is transmitted to the servo valve 74 which is operatively connected to the extensible member 62 whereby the head portion 10 is turned relative to the base portion 12 and about the vertical axis thereof to move the work piece 2 into and out of the head portion 10 and trim the work piece 2 in a shape conforming to the peripheral edge of the template 14.

After the work piece 2 has been trimmed to the desired shape, the carriage 5 is moved along the track 6 to a position having the template 14 and the work piece 2 in engagement with the head portion 11 of the forming unit 7. The marginal edge portion 4 of the work piece 2 is positioned and gripped between the upper and lower bending rollers 143 and 144 respectively and the adjusting screws 132 and 133 are adjusted to position the edge or rim of the roller 128 at a selected spacing from the vertical axis of the base portion 13 when the roller 128 is in engagement with the peripheral edge of the template 14. The drive motor 165 is energized to effect rotation of the upper and lower bending rollers 143 and 144 respectively and thereby rotation of the work piece 2 and the template 14 about the shaft 36 of the carriage 5. The extensible member 166 is operated to move the bending head 140 in the arcuate path between the side frames 126 and 127 and thereby bend a marginal edge portion 4 of the work piece 2 to a desired position relative to the work piece 2. Movement of the roller 128 is transmitted to the servo valve 129 which is operatively connected to the extensible member 117 whereby the head portion 11 is turned relative to the base portion 13 and about the vertical axis thereof to move the work piece 2 into and out of the head portion and maintain the bending rollers 143 and 144 in alignment with the peripheral edge of the guide template 14.

It is to be understood that while I have illustrated and described one form of my invention, it is not to be limited to this specific form or arrangement of parts herein described and shown.

What I claim and desire to secure by Letters Patent is:

1. Apparatus for forming a marginal edge portion of metal work pieces and comprising:
   a. an elongated track having opposite ends;
   b. a carriage in engagement with said track and freely movable therealong;
   c. means on said carriage for rotatably mounting a guide template having a desired shape and size of a marginal edge portion thereof with the axis of rotation being fixed relative to said carriage;
   d. means mounting a metal piece to have a marginal edge portions thereof formed for rotation with the guide template;
   e. forming means adjacent one end of said track and having rotatable means engageable with the work piece for gripping and forming a marginal edge portion thereof, driving means rotating said rotatable means to turn the work piece and template on said carriage, means supporting said forming means for rotation on an axis spaced from and parallel to the axis of rotation of the template to change angular relationship of the forming means to the work piece margin;
   f. template following means on said forming means and engageable with the marginal edge portion of the guide template forwardly of the forming means during rotation thereof on said carriage; and
   g. means operatively connected to said template following means and to said forming means for turning said forming means on its axis of rotation to change the angle of approach of said means for gripping and forming the marginal edge portion of the work piece in accordance with the template edge to thereby effect movement of the carriage on the track and the advance of the work piece into said forming means.

2. An apparatus for forming a marginal edge portion of metal work pieces as set forth in claim 1 wherein:
   a. said forming means support means has a base portion and the axis of rotation is substantially vertical;
   b. said forming means has a head portion mounted on said base portion for rotation about said vertical axis;
   c. said template following means is mounted on said head portion and said means for turning said forming means is operatively connected to said head portion for turning same; and
   d. said template following means is spaced from and in leading relation with said vertical axis whereby said head portion is turned to maintain said means for gripping and forming the marginal edge portion of the work piece in engagement with the work piece in response to a change of shape of the marginal edge portion of the guide template.

3. An apparatus for forming a marginal edge portion of metal work pieces as set forth in claim 2 wherein:
   a. said template following means is mounted on a linkage having one end thereof adjustably mounted on said head portion of said forming means thereby permitting adjustment of the spacing between the vertical axis of said base portion and said template following means; and
   b. the other end of said linkage is operatively connected to said means for moving said head portion and includes means responsive to travel of said template following means along the marginal edge portion of the guide template.

4. An apparatus for forming a marginal edge portion of metal work pieces as set forth in claim 1 wherein:
   a. said means for gripping and forming a marginal edge portion of the metal work piece includes:
      1. an upper shear blade mounted on a rotatably mounted upper shaft;
      2. a work piece driver mounted on the rotatably mounted upper shaft and having a surface engageable with one surface of the metal work piece;
      3. a lower shear blade mounted on a rotatably mounted lower shaft and having a surface engageable with the other surface of the metal work piece to thereby grip the work piece between said work piece driver and said lower shear blade; and
      4. said driving means is on said forming means and operatively connected to the upper shaft and to the lower shaft for rotating same;
   b. second forming means are positioned adjacent the other end of said track and having means thereon engageable with the work piece for gripping and forming a marginal edge portion thereof while rotating the work piece and template on said carriage;
   c. said second forming means has template following means mounted thereon and means operatively connected to said template following means and to said second forming means for turning same relative to the marginal edge portion of the work piece to effect advance thereof into said second forming means; and
   d. said means on said second forming means for gripping and forming a marginal edge portion of the metal work piece includes:
      1. an upper bending roller mounted on a rotatably mounted upper shaft and engageable with one surface of the metal work piece;
      2. a lower bending roller mounted on a rotatably mounted lower shaft and engageable with the other surface of the metal work piece to thereby grip the work piece between said upper bending roller and said lower bending roller;
      3. means on said second forming means rotatably supporting said upper shaft and said lower shaft and operatively connected to said upper shaft and to said lower shaft for rotating same; and
      4. means operatively connected to said means for rotatably supporting said upper shaft and said lower shaft for moving same in an arc to thereby form a flange in the marginal edge portion of the work piece.

5. An apparatus for forming a marginal edge portion of metal work pieces as set forth in claim 4 wherein said first named forming means and said second forming means each include:
   a. said supporting means having a base portion and the axis of rotation is substantially vertical;
   b. a head portion mounted on said base portion for rotation about said vertical axis and having said respective template following means and said respective means for turning said respective forming means mounted on said head portion thereof; and
   c. means on said head portion for positioning said template following means in spaced and leading relation with the vertical axis of said base portion whereby said head portion is turned to maintain said respective means for gripping and forming the marginal edge portion of the work piece in engagement with the work piece in response to a change of shape of the marginal edge portion of the guide template.

6. An apparatus for forming a marginal edge portion of metal work pieces as set forth in claim 5 wherein:
   a. said respective template following means are each mounted on a linkage having one end thereof adjustably mounted on said respective head portion thereby permitting adjustment of the spacing between the vertical axis of said respective base portion and said template following means; and
   b. the other end of each linkage is operatively connected to said means for turning said respective head portion and includes means responsive to travel of said template following means along the marginal edge portion of the guide template.

7. An apparatus for forming a marginal edge portion of metal work pieces and comprising:
   a. an elongated track having opposite ends, said track having a pair of laterally spaced generally horizontal rails;
   b. a carriage in engagement with said track and movable therealong, said carriage having a plurality of spaced rollers rotatably mounted therein and in engagement with said rails of said track whereby said carriage is substantially freely movable along said track;

c. means on said carriage for rotatably mounting a guide template having a desired shape and size of a periphery of a marginal edge portion thereof with the axis of rotation being fixed relative to said carriage;

d. means on said carriage for mounting a metal work piece to have a marginal edge portion thereof formed for rotation with the guide template;

e. means on said carriage and in engagement with said means for mounting the work piece on said carriage for adjusting the work piece vertically relative to said track;

f. forming means adjacent one end of said track and having rotatable means engageable with the work piece for gripping and forming a marginal edge portion thereof, driving means rotating said rotatable means to turn the work piece and template on said carriage, means supporting said forming means for rotation on an axis spaced from and parallel to the axis of rotation of the template to change angular relationship of the forming means to the work piece margin;

g. template following means on said forming means and engageable with the periphery of the marginal edge portion of the guide template forwardly of the forming means during rotation thereof on said carriage; and h. means operatively connected to said template following means and to said forming means for turning said forming means on its axis of rotation to change the angle of approach of said means for gripping and forming the marginal edge portion of the work piece in accordance with the template edge to thereby effect movement of the carriage on the track and advance of the work piece into said forming means.

8. An apparatus for forming a marginal edge portion of metal work pieces as set forth in claim 7 wherein:

a. said forming means support means has a base portion and the axis of rotation is substantially vertical;

b. said forming means has a head portion mounted on said base portion for rotation about said vertical axis;

c. said template following means is mounted on said head portion and said means for turning said forming means is operatively connected to said head portion for turning same;

d. said template following means is spaced from and in leading relation with said vertical axis whereby said head portion is turned to maintain said means for gripping and forming the marginal edge portion of the work piece in engagement with the work piece in response to a change of shape of the periphery of the marginal edge portion of the guide template;

e. said template following means is mounted on a linkage having one end thereof adjustably mounted on said head portion of said forming means thereby permitting adjustment of the spacing between the vertical axis of said base portion and said template following means; and f. the other end of said linkage is operatively connected to said means for turning said head portion and includes means responsive to travel of said template following means along the periphery of the marginal edge portion of the guide template.

9. An apparatus for forming a marginal edge portion of metal work pieces as set forth in claim 8 wherein:

a. said means on said forming means for gripping and forming a marginal edge portion of the metal work piece includes:
   1. an upper shear blade mounted on a rotatably mounted upper shaft;
   2. a work piece driver mounted on the rotatably mounted upper shaft and positioned adjacent said upper shear blade, said work piece driver having a surface engageable with one surface of the metal work piece;
   3. a lower shear blade mounted on a rotatably mounted lower shaft and having a surface engageable with the other surface of the metal work piece to thereby grip the work piece between said work piece driver and said lower shear blade; and
   4. said driving means is on said forming means and operatively connected to the upper shaft and to the lower shaft for rotating same;

b. said upper shear blade and said lower shear blade have opposed cutting edges positioned above and substantially aligned with said vertical axis whereby turning of said head portion in response to travel of said template following means maintains said cutting edges directly above and aligned with the periphery of the marginal edge portion of the guide template;

c. second forming means are positioned adjacent the other end of said track and having means thereon engageable with the work piece for gripping and forming a marginal edge portion thereof while rotating the work piece and template on said carriage;

d. said second forming means has a base portion and a head portion mounted on said base portion for rotation about a vertical axis;

e. said means on said second forming means for gripping and forming a marginal edge portion of the metal work piece includes:
   1. an upper bending roller mounted on a rotatably mounted upper shaft and engageable with one surface of the metal work piece;
   2. a lower bending roller mounted on a rotatably mounted lower shaft and engageable with the other surface of the metal work piece to thereby grip the work piece between said upper bending roller and said lower bending roller;
   3. means on said second forming means rotatably supporting said upper shaft and said lower shaft and operatively connected to said upper shaft and to said lower shaft for rotating same; and
   4. means operatively connected to said means for rotatably supporting said upper shaft and said lower shaft for moving same in an arc to thereby form a flange in the marginal edge portion of the work piece;

f. said second forming means has template following means mounted on said head portion thereof and means operatively connected thereto for turning said head portion; and g. said upper bending roller and said lower bending roller have opposed work piece engaging surfaces positioned above and substantially aligned with the vertical axis of said base portion whereby turning of said head portion in response to travel of said template following means maintains said bending roller surfaces directly above and aligned with the marginal edge portion of the guide template.

10. An apparatus for forming a marginal edge portion of metal work pieces as set forth in claim 7 wherein:
- a. said forming means support means has a base portion and said forming means has a head portion mounted on said base portion for rotation about a vertical axis;
- b. said forming means has a said template following means mounted on said head portion thereof and means operatively connected to said template following means and to said head portion for turning said head portion and said means for gripping and forming the marginal edge portion of the work piece;
- c. said means on said forming means for gripping and forming a marginal edge portion of the metal work piece includes an upper shear blade and a lower shear blade having opposed cutting edges for trimming the marginal edge portion of the work piece;
- d. second forming means are positioned adjacent the other end of said track and having means thereon engageable with the metal work piece for gripping and forming a marginal edge portion thereof while rotating the work piece and template of said carriage;
- e. said second forming means has a base portion having a substantially vertical axis and a head portion mounted on said base portion for rotation about the vertical axis of said base portion;
- f. said second forming means has template following means mounted on said head portion thereof and engageable with the marginal edge portion of the guide template during rotation thereof on said carriage;
- g. said second forming means has means operatively connected to said template following means and to said head portion for turning said head portion and said means for gripping and forming the marginal edge portion of the work piece relative to the marginal edge portion of the work piece to move said means for gripping and forming the marginal edge portion of the work piece to thereby effect feed at the work piece into said second forming means in response to engagement of said template following means with the marginal edge portion of the guide template; and
- h. said means on said second forming means for gripping and forming a marginal edge portion of the metal work piece includes an upper bending roller and a lower bending roller having opposed work piece surface engaging surfaces mounted for forming a flange on the work piece.

* * * * *